United States Patent [19]

Mackaay

[11] Patent Number: 5,141,197
[45] Date of Patent: Aug. 25, 1992

[54] CAMPER BRACER SUPPORT

[75] Inventor: Henry Mackaay, Westbank, Canada

[73] Assignee: Great White Northern Industries, Inc., Kelowna, Canada

[21] Appl. No.: 754,286

[22] Filed: Aug. 30, 1991

Related U.S. Application Data

[63] Continuation of Ser. No. 604,723, Oct. 26, 1990, abandoned.

[51] Int. Cl.⁵ ............................................. F16M 11/00
[52] U.S. Cl. .................................. 248/439; 248/188.5; 248/188.6; 248/352; 248/354.5; 280/765.1
[58] Field of Search ................... 248/188.6, 188.5, 644, 248/676, 122, 124, 161, 166, 168, 169, 436, 439, 440, 354.1, 354.5, 170, 171, 165, 352; 52/299, 638, 655; 280/763.1, 764.1, 765.1, 766.1; 254/45, 49

[56] References Cited

U.S. PATENT DOCUMENTS

| | | | |
|---|---|---|---|
| 1,895,170 | 1/1933 | Nabors | 280/763.1 |
| 2,162,181 | 6/1939 | Skinner | 280/763.1 |
| 3,672,524 | 6/1972 | Conrad | 254/49 |
| 3,715,100 | 2/1973 | Spencer | 254/49 |
| 3,743,125 | 7/1973 | Ashley | 254/49 |
| 3,933,372 | 1/1976 | Herndon | 280/763.1 |
| 4,723,744 | 2/1988 | Baker, Jr. | 248/165 |

FOREIGN PATENT DOCUMENTS 204857 5/1956 Australia ..................... 280/764.1

Primary Examiner—David L. Talbott
Attorney, Agent, or Firm—Fitch, Even, Tabin & Flannery

[57] ABSTRACT

A mountable support for a modular unit, such as a camper body, including telescoping support pillars with pivotal pads as well as telescoping arms for longitudinal support against inadvertent forward or rear section rotation from the support position, which is affixed to the body for storage at a reference position and having pivotal forward and rear sections for rotation to a support position for storage of the body after its removal from a transport vehicle bed.

2 Claims, 2 Drawing Sheets

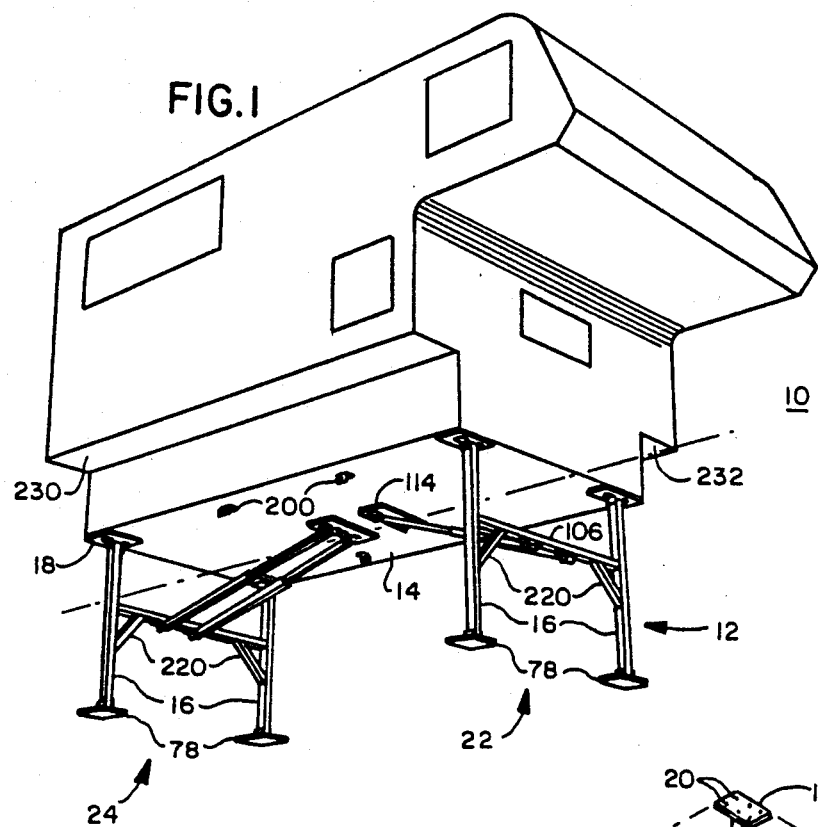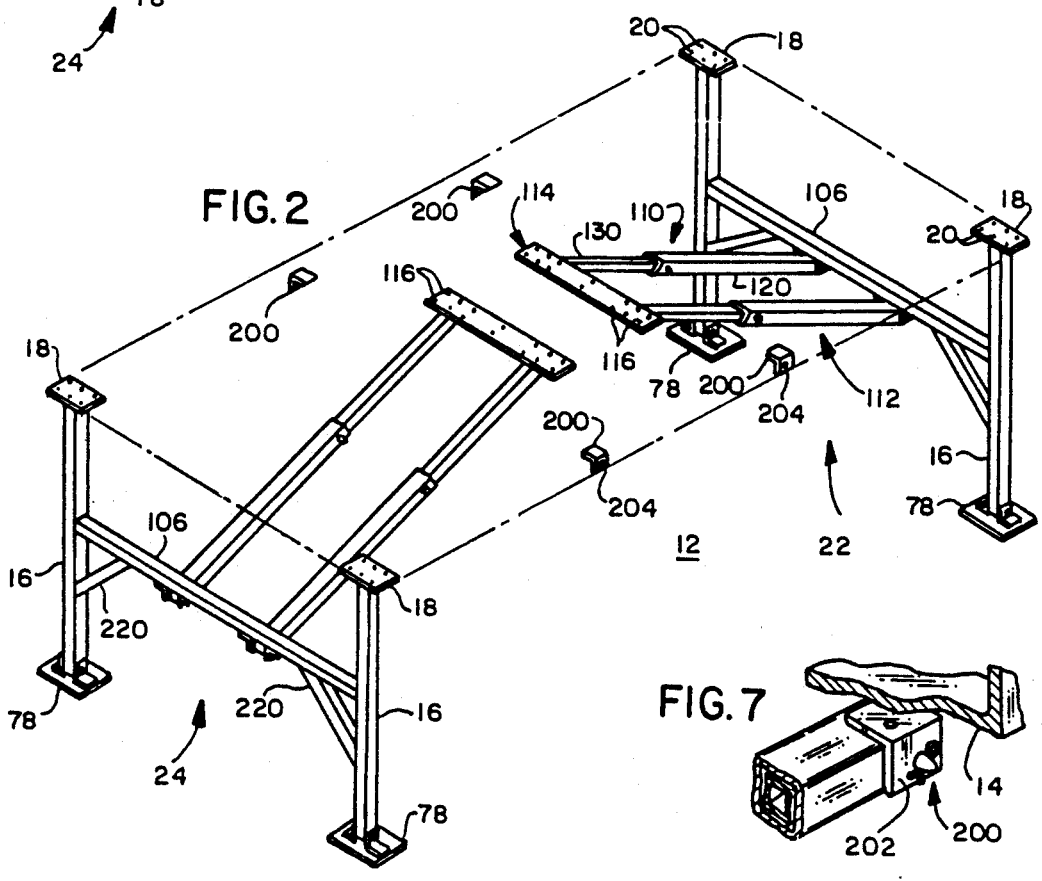

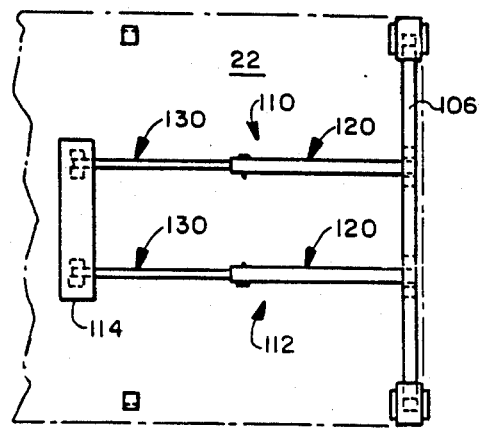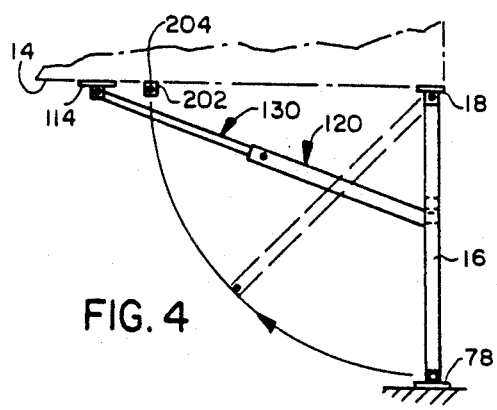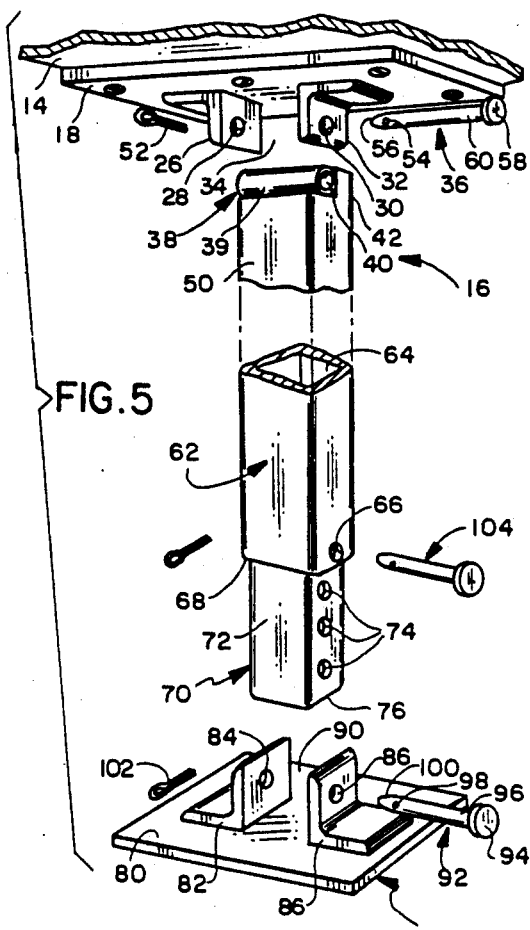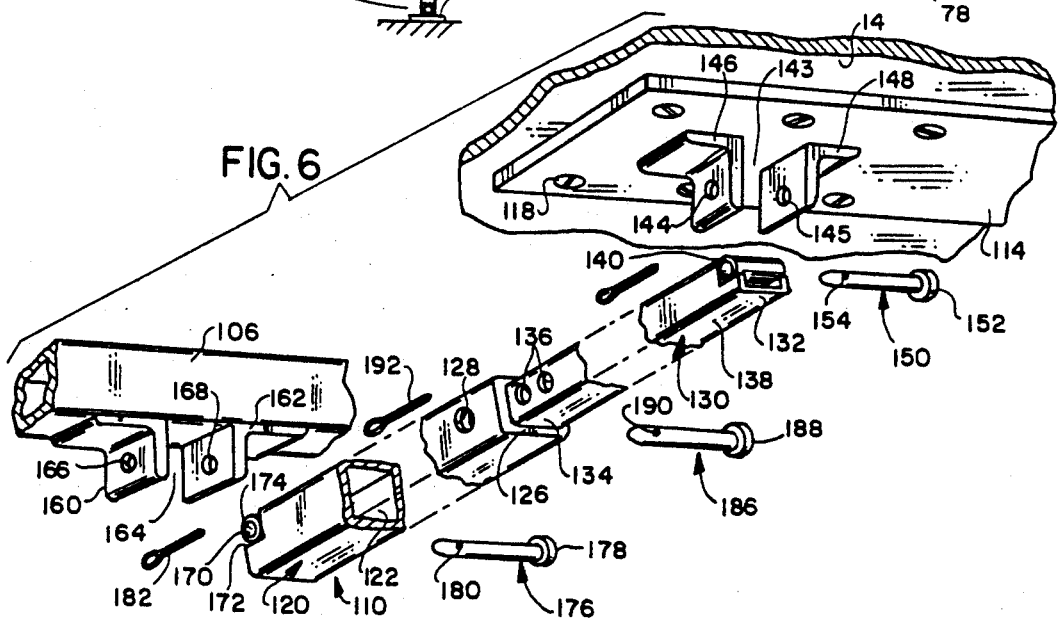

CAMPER BRACER SUPPORT

This application is a continuation of U.S. patent application Ser. No. 604,723 filed Oct. 26, 1990 now abandoned.

BACKGROUND OF THE INVENTION

The present invention relates to apparatus for supporting structures mountable on vehicles. More specifically, the invention provides a support apparatus affixed to and integral with a camper assembly, which is generally mountable and transportable on a truck bed.

Camping either for family recreation or sport has increased over the recent years as an activity and the available equipment has expanded to accommodate the needs and wants of the camping market. Although tents, towed trailers and self-propelled motor homes are utilized for camping, there are a large number of portable campers or camper caps available for mounting on truck beds. These readily mountable and removable campers allow the user the opportunity to enjoy a compact integral camping facility with relatively comfortable facilities without limiting the use of the vehicle to the camping activity. Consequently, the truck is both a utilitarian and a recreational vehicle. However, operation in this dual mode requires accommodation for the removal and support of the stored camper, which operation is hopefully provided with a minimal amount of aggravation and effort. In addition, the support apparatus should be adaptable for either long or short term support and storage of the camper.

Earlier camper support devices frequently utilized manual or motorized drive means to remove the camper. Other devices required complex assemblies involving side support arrangements in cooperation with supplemental stands and braces. Indicative of the latter devices is the storage stand disclosed in U.S. Pat. No. 4,723,744 to Baker, Jr. et al., which provides a segmented storage stand. The stand is provided with interlocking arms and endposts for disassembly and storage of the stand when it is not in use. However, this would also require a storage location for the disassembled apparatus and subsequent reassembly. Alternatively, the structure could be left assembled and unattended, which exposes it to theft or atmospheric damage. Further, this device requires separate and independent lifting jacks at the sidewalls of the camper to not only lift the camper body from the truck bed but also to provide lateral support for the camper.

Another support rack for a camper body is illustrated in U.S. Pat. No. 3,715,100 to Spencer, which utilizes a pivotal and interconnected frame with a parallelogram shape. Flexible frame holding means limit the pivot range of the frames for moving of the camper body onto and off the truck bed. The frames must be provided under the camper body and positioned to limit any sliding by the lower cross members during the pivoting mounting of the camper body. Frame locking means hold the parallelogram frames rigid to support the camper body in an elevated position.

Although these prior devices made provision for supporting a camper body and more particularly a recreational camper, they were discrete components requiring simultaneous assembly on both sides of the vehicle, separate disassembly and storage apart from the camper body.

SUMMARY OF THE INVENTION

The present invention provides a camper body support assembly, which is integral with the camper for storage on the camper body in an unobtrusive position during camper usage, and is readily operable by a single individual to provide storage support of the camper body. The support or brace is also easily disengaged and stored by a single individual during or before mounting of the camper on the truck bed. The support assembly stores for the camper at an elevated position for ready mounting of the camper, which maintains the camper from ground contact to avoid the buildup of debris around and against the camper body.

Although the illustrated embodiment is provided for a camper, the support apparatus is also positionable on or under a modular load carrying unit for mounting on a truck or other vehicle, which support would be mountable on the unit and collapsible for storage of the support on the unit. As the support assembly has a forward and rear segment, which are structurally similar, but are mounted in a mirror image, manufacture of the assembly is limited to a single structure. The collapsibility of the support and its retention on the camper or other unit obviates the necessity for separately storing and maintaining the support assembly. Further, the integral nature of the assembly insures that the support is always available and ready for use whether at a storage site or at a remote location. The precise positioning of the support arms and locking them into place is dependent upon the nature of the camper and the available storage facility.

BRIEF DESCRIPTION OF THE DRAWINGS

In the several figures of the Drawings, like reference numerals identify like components, and in the drawings:

FIG. 1 is a perspective bottom view of a camper body and support assembly at a support position for the body;

FIG. 2 is a top perspective view of the support assembly component at the support position;

FIG. 3 is a top plan view of a segment of the support assembly at the support position;

FIG. 4 is an elevational view of the segment of the support assembly in FIG. 3;

FIG. 5 is a perspective exploded view in partial section of a support pillar, foot and mounting bracket of the assembly;

FIG. 6 is a perspective exploded view in partial section of a telescoping arm, mounting bracket and cross-brace; and FIG. 7 is a perspective view of the retaining bracket and pin at the retention position.

DETAILED DESCRIPTION OF THE INVENTION

Recreational vehicles include towable trailers, self-propelled mobile homes and camper bodies, which are temporarily mountable on truck beds. Other modular load-carrying units are also mountable on truck beds. In an exemplary illustration, a camper body 10 has storage support assembly 12 secured to body bottom 14 in FIG. 1. Support assembly pillars 16 vertically extend from bottom 14 at an elevated or support position for storage of body 10, which provides clearance for debris under body 10, but avoids direct camper contact with the ground and any extraneous material. In this position, body 10 is ready for mounting on a transport vehicle, such as a truck bed (not shown).

Support assembly 12 with forward segment 22 and rear segment 24 in FIG. 1 is secured to camper bottom 14, which is shown with a generally rectangular shape. A mounting plate 18 at the upper or pivot end of each of pillars 16 is secured to bottom 14 and has a plurality of apertures 20 for anchoring means, such as screws, nails or staples. In FIGS. 1 and 2, forward and rear segments 22, 24 are mounted and secured to bottom 14 at the respective forward and rear edges of camper 10. As segments 22 and 24 are similarly constructed only one of the segments will be described, and it will be understood that the description is applicable to both segments.

Forward segment 22 has a pair of mounting plates 18 and pillars 16, however, only one of the mounting plate 18 and pillar 16 arrangements is shown in an exploded subassembly in FIG. 5, which subassembly may be noted at each of the pillar and plate arrangements in FIGS. 1 and 2. Mounting plate 18 has first clevis 26 with port 28 and second clevis 30 with second port 32, which ports 28, 30 are aligned to receive pivot pin 36. First and second clevis 26, 30 have gap 34 between them for the upper end of pillar 16. Pivot bushing 38 with throughbore 40 at pillar upper end 42 is nested in a notch 44 at upper end 42 for positioning in gap 36. Notch or step 44 has a base 46 and a rear support wall 48, which arrangement in the preferred embodiment provides the outer surface 39 of bushing 38 aligned with pillar upper edge 42 and pillar sidewall 50. In the as-assembled structure of FIGS. 1 and 2, bushing 38 in gap 34 has throughbore 40 aligned with ports 28 and 32, and pin 36 extends through these aligned ports and throughbore to rotatably secure pillar 16 to mounting plate 18. Expanded head 58 at first pin end 60 maintains pin 36 in position against the clevis and cotter pin 52 is insertable through passage 54 in second pin end 56 to secure pin 36 in position. In the mounted and secured position, each pillar 16 is rotatable between the stored or reference position against bottom 14 and the extended, support position of FIGS. 1 and 2. Rear support wall 48 at upper end 42 also acts as a positive stop to limit the rotation of pillar 16 in the support position.

In a preferred embodiment shown in FIG. 5, pillar 16 is a tubular structure, which has outer section 62 with central passage 64, sidewall 50 and apertures 66 at lower end 68. Inner section 70 has second sidewall 72 with a plurality of cross-ports 74 vertically arranged along second sidewall 72 from exposed end 76, which inner section 70 is slidably mounted in central passage 64. Inner section 70 is slidable in central passage 64 to provide alignment of aperture 66 with one of inner-tube cross-ports 74. Cross-pin 104, which is similar to pin 36, is matable with the aligned aperture 66 and cross-port 74 to secure pillar 16 and body 10 to a desired height at the support position.

Foot or pad 78 has a clevis arrangement at its upper surface 80 similar to the clevis structure of mounting plate 18. Third clevis 82 with port 84 and fourth clevis 86 with port 88 have a gap 90 therebetween for lower end 76 of inner tube section 70. Third and fourth clevis ports 84, 88 are alignable with an inner section crossport 74 to receive a mounting or pivot pin 92, which has an expanded head 94 at a first end 96 and an aperture 98 at its second end 100. Pivot pin 92 is insertable in aligned clevis ports 84, 88 and cross-port 74 to pivotally secure pad 78 to inner-tube exposed end 76. Pin 92 is secured in ports 84, 88 by mating cotter pin 102 with pin aperture 98, which pin 92 pivotally couples foot or pad 78 at the lower end of pillar 16 for self-adjustment at contact with the ground, storage pad or other surface to a secure position for pillar 16 at the support position.

The two pillars 16 of forward section 22 in FIGS. 1 and 2 are coupled at sidewalls 50 of outer tube 62 by cross brace 106, which provides a transverse stabilizing member to pillars 16 and section 22. Brace 106 may be joined to pillars 16 by any means known in the art, such as soldering, brazing, welding or adhesive. In FIGS. 1-4 and 6, telescoping arms 110 and 112 of forward segment 22 are coupled between cross-brace 106 and second mounting plate 114 on camper bottom wall 14. Plate 114 has a plurality of portals 116 for securing means 118, such as screws, to affix plate 114 to bottom wall 14. As telescoping arms 110 and 112 are similarly coupled, assembled and operable only one of the arms will be described and it will be understood that the description is also applicable to the other arm.

Arm 110 has inner tube section 130 and outer tubular section 120 with longitudinal passage 122, first end 124, second end 126 and cross-port 128 at second end 126. Inner tube section 130 is slidably mounted in longitudinal passage 122 at second end 126 and has an exposed end 132 and internal end 134 with a plurality of apertures 136 longitudinally extending from exposed end 132 and aligned along sidewall 138. Exposed end 132 has a second stepped notch 140 with a bushing or annular collar 142 in the notch transversely mounted to longitudinal sidewall 138, which bushing 142 is positionable in gap 143 and alignable with ports 144, 145, respectively, of mounting-plate first clevis 146 and second clevis 148. Inner tube 130 of arm 110 is pivotally coupled to mounting plate 114 by coupling pin 150 extending through ports 144, 145. Pin 150, which is similar to pins 36, 92 and 104, has expanded head 152 at one end and aperture 154 at its opposite end for mating with cotter pin 156 and retention of pin 150 in the clevis and collar. Pivot pin 150 extends through the aligned bushing 142 and clevis ports 144, 145 to pivotally secure tube 130 to mounting plate 114.

Brace 106 also has a clevis arrangement for each of arms 110 and 112. First brace clevis 160 and second brace clevis 162 have gap 164 therebetween with aligned ports 166 and 168, respectively. Second arm bushing 170 secured in outer tube notch 172 at tube first end 124 has throughbore 174 alignable with ports 166 and 168 for pivotal securing in gap 164 by pivot pin 176. Pin 176 has expanded head 178 and aperture 180 at its opposite end for engagement and securing in position by cotter pin 182.

Brackets 200 are positioned about the perimeter of body bottom 14 and have a sidewall 202 with a port 204, which port 204 is alignable with any of pillar-inner-tube passages 74 of the related pillar 16 for mating engagement by a cross-pin 186 to secure pillars 16 at the reference or storage position. As pillars 16 are pivoted from the reference position to the support position, which rotational movement is illustrated in FIG. 4, arms 110 and 112 are also pivoting on pins 150 and 176, and arm inner and outer tubes 120 and 130, respectively, are telescoping relative to each other. At the support position, outer tube port 128 and one of inner tube passages 136 are alignable to receive cross-pin 186 for securing at this position, which pin 186 has expanded head 188 at one pin end and an aperture 190 at the opposite end to mate with cotter pin 192 after insertion through port 128 and passage 136. This mating engagement by pin 186 secures the telescoped arms 110, 112 at the support position and prevents inadvertent inward telescoping of the arms after positioning camper body 10 on pillars 16.

In a further embodiment, angle braces 220 couple cross-brace 106 and pillar outer tube 62 at an angle, which provides added flexural stability to these coupled members and inhibits torsional strain on cross-pins 150 and mounting plates 18 and 114.

Arms 110, 112 and pillars 16 of forward segment 22 are telescoping components, which provides ease of adjustment to a desired height or length. The inner and outer tubular components may all be of the same materials, such as steel tube and rod, and sizes to enhance manufacturing capability and minimize component inventory. Support assembly 12 is easily mounted on camper 10 as it requires securing only the six illustrated plates 118 and 114 to body bottom 14. The remaining arms 110, 112 and pillars 16 with braces 106 are mountable by insertion of cross-pins through aligned clevis ports and bushing bores.

Utilization of support assembly 12 is readily accommodatable by a single operator. In an exemplary illustration, camper body 10 is positioned on jack stands, which are known in the art but not shown, at camper sidewalls 230, 232 and the mounting vehicle is driven from under camper body 10. Thereafter, forward support segment 22 is lowered from the reference position to the support position by removal of pins 186 from brackets 200 from each side of camper bottom 14. In the vertical and support position, pillars 16 are adjusted to the desired support height by slidably adjusting inner tube 70 and securing it at the desired height by insertion of a cross-pin 104 in the aligned passages 66 and 74 on each of pillars 16. Pads or feet 78 on each pillar 16 pivot on cross-pin 92 to self-adjust to support the individual pillar 16. The same sequence of operations positions rear support assembly 24. After positioning arms 110 and 112 of each assembly 22 and 24 at the support position, cross-pins 186 are inserted in aligned ports 128 and passages 136 of the respective arms to secure the arms and pillars against inadvertent longitudinal movement and collapse of the respective support segment to the storage position. Subsequently, the assemblies 22 and 24 are restorable to the reference and storage position by removal of cross-pins 186, which allows arms 110, 112 to collapsibly telescope, and pillars 16 are adjusted to the desired length by removal of pins 104 for storage against the bottom 14. The storage and initiating operations may be performed by a single user without complete removal, disassembly and storage of support assembly 12.

While only a particular embodiment of the invention has been described and claimed herein, it is apparent that various modifications and alterations of the invention may be made. It is therefore the intention in the appended claims to cover all such modifications and alterations as may fall within the true spirit and scope of the invention.

What is claimed is:

1. A mountable support for supporting a modular unit at a storage position, which unit has a bottom wall, a front end, a back end and a longitudinal axis, said support comprising:

a forward section and a rear section;

a plurality of support pillars, each said pillar having a first end and defining a notch at said first end;

each of said forward and rear sections having a first pillar mounting plate and a second pillar mounting plate;

each said pillar mounting plate has a first clevis with a first port and a second clevis with a second port, which first and second ports are aligned, said first clevis and second clevis cooperating to define a gap;

pivoting means for pivoting said pillars, said pivoting means coupling at least one pillar to each said mounting plate, said pillars pivotally operable between a reference and storage position in proximity to said bottom wall and a support position generally normal to said bottom wall;

a first pillar and a second pillar pivotally coupled by said pivoting means to said first and second pillar mounting plate, respectively;

each said pillar has an outer tube member with said first end, a second end, a portal at said second end and a central passage, and an inner member with an internal end, an exposed end, and a plurality of apertures through said inner member and aligned along said inner member from said exposed end toward said internal end, said inner member slidably mated in said central passage and adjustable to align said outer tube portal and any of said inner member apertures to receive a cross-pin to fix said pillar at a desired length;

each said pillar at said first end has a base wall and a back wall in said pillar below said first end and cooperating to define said notch, which back wall at said first end is operable to contact said pillar mounting plate to act as a rotation-limiting stop for said pillar at said support position;

a first plurality of annular collars, each said collar having a throughbore, a collar secured in each said pillar notch;

each said pillar first end and collar positioned in said mounting plate gap and said collar throughbore aligned with said first and second clevis ports;

a plurality of cross-pins, a cross-pin positioned through said aligned ports and throughbores to secure said pillar to said mounting plate and to allow pillar pivotal rotation;

a cross-brace coupled between said first pillar and second pillar which cross-brace is transverse to said longitudinal axis to laterally stabilize said pillars and sections;

means for securing said forward and rear section mounting plates to said bottom wall at said front and back ends, respectively;

a plurality of foot pads for said pillars, each said pad having a first pad clevis with a first port and a second pad clevis with a second port, said first and second clevis mounted on said pad to define a second gap therebetween with said first and second pad-clevis ports aligned;

one of said pads positioned at each said pillar inner member exposed end, one of said inner member apertures alignable with said first and second pad-clevis ports;

a cross-pin positioned through said aligned first and second ports and inner member apertures to pivotally secure said pad to said inner member, which pads contact a surface and are pivotal to adjust to the surface at said support position;

a second-mounting-plate for each said forward and rear sections, which second-mounting-plates are generally centrally located and secured on said bottom wall by said securing means;

each said forward and rear sections having at least one longitudinal locking arm with a first end and a second end, which locking arm is connected and secured between said brace and said second-mounting-plate at said support position to longitudinally secure said section at said support position;

each said longitudinal locking arm having a first end and an exposed end, a first notch at said first end and a second notch at said exposed end;

a second plurality of annular collars with a throughbore, one of said collars secured in each said first and second locking arm notch;

each said second mounting plate having at least one second-mounting-plate clevis arrangement;

each said cross-brace having at least one brace clevis arrangement;

each said second-mounting-plate and brace clevis arrangements having a first clevis with a first port and a second clevis with a second port, said first and second clevis affixed to said second-mounting-plate and cooperating to define a gap therebetween with said first and second ports aligned;

each said longitudinal locking arm first end positioned in said brace clevis gap with said annular collar throughbore aligned with said first and second ports;

said longitudinal arm exposed end positioned in a second mounting plate clevis gap with said annular collar throughbore aligned with said first and second ports;

a cross-pin extending through each said aligned collar and clevis port for pivotal rotation of said locking arm during rotation of said forward section and rear section into said reference and support positions;

each said locking arm has a tubular arm outer member with a sidewall, a second end with an aperture, a central passage and a first end;

an inner member with a second sidewall, an internal end, said exposed end and a plurality of cross-passages generally extending along said inner member sidewall from said internal end, which internal end and inner member are slidably matable in said outer member central passage; and said outer member aperture alignable with one of said inner member cross-passages to receive a cross-pin through said aligned cross-passage and aperture to secure said locking arm to maintain said brace and pillars at said support position.

2. A mountable support for supporting a modular unit at a storage position, which unit has a bottom wall, a front end, a back end and a longitudinal axis, said support comprising:

a forward section and a rear section;

a plurality of support pillars, each said pillar having a first end and defining a notch at said first end;

each of said forward and rear sections having a first pillar mounting plate and a second pillar mounting plate;

each said pillar mounting plate has a first clevis with a first port and a second clevis with a second port, which first and second ports are aligned, said first clevis and second clevis cooperating to define a gap;

pivoting means for pivoting said pillars, said pivoting means coupling at least one pillar to each said mounting plate, said pillars pivotally operable between a reference and storage position in proximity to said bottom wall and a support position generally normal to said bottom wall;

a first pillar and a second pillar pivotally coupled by said pivoting means to said first and second pillar mounting plate, respectively;

each said pillar has an outer tube member with said first end, a second end, a portal at said second end and a central passage, and an inner member with an internal end, an exposed end, and a plurality of apertures through said inner member and aligned along said inner member from said exposed end toward said internal end, said inner member slidably mated in said central passage and adjustable to align said outer tube portal and any of said inner member apertures to receive a cross-pin to fix said pillar at a desired length;

each said pillar at said first end has a base wall and a back wall in said pillar below said first end and cooperating to define said notch, which back wall at said first end is operable to contact said pillar mounting plate to act as a rotation-limiting stop for said pillar at said support position;

a plurality of annular collars, each said collar having a throughbore, a collar secured in each said notch;

each said pillar first end and collar positioned in said mounting plate gap and said collar throughbore aligned with said first and second clevis ports;

a plurality of cross-pins, a cross-pin positioned through said aligned ports and throughbores to secure said pillar to said mounting plate and to allow pillar pivotal rotation;

a cross-brace coupled between said first pillar and second pillar which cross-brace is transverse to said longitudinal axis to laterally stabilize said pillars and sections;

means for securing said forward and rear section mounting plates to said bottom wall at said front and back ends, respectively;

a plurality of storage brackets, each said bracket having means for mounting on said bottom wall and having a flange with a flange port normally extending from said bottom wall; and each said pillar in proximity to said flange at said reference position, said flange port alignable with one of said inner member apertures and a cross-pin extending through said aligned flange port and aperture to secure said pillar at said storage position.

* * * * *

UNITED STATES PATENT AND TRADEMARK OFFICE
CERTIFICATE OF CORRECTION

PATENT NO. : 5,141,197
DATED : August 25, 1992
INVENTOR(S) : Mackaay It is certified that error appears in the above-identified patent and that said Letters Patent is hereby corrected as shown below:

TITLE PAGE:

[75] INVENTOR, after "Westbank," insert --British Columbia,--.

[73] ASSIGNEE, after "Kelowna," insert --British Columbia,--.

[56] References Cited - U.S. PATENT DOCUMENTS, change "Baker, Jr." to --Baker, Jr. et al.--.

Column 1, line 5, after "1990" insert a comma.
Column 2, line 40, change "component" to --components--.
Column 5, line 21-22, after "illustration" change the period to a comma.

Signed and Sealed this

Sixteenth Day of November, 1993

Attest:

BRUCE LEHMAN

*Attesting Officer*   Commissioner of Patents and Trademarks